(12) United States Patent
Ho

(10) Patent No.: US 7,072,175 B2
(45) Date of Patent: Jul. 4, 2006

(54) LCD MONITOR PEDESTAL

(75) Inventor: Wen-Chung Ho, Miaoli (TW)

(73) Assignee: BENQ Corporation, Taoyuan (TW)

( * ) Notice: Subject to any disclaimer, the term of this patent is extended or adjusted under 35 U.S.C. 154(b) by 125 days.

(21) Appl. No.: 10/097,049

(22) Filed: Mar. 12, 2002

(65) Prior Publication Data

US 2002/0140875 A1 Oct. 3, 2002

(30) Foreign Application Priority Data

Mar. 21, 2001 (TW) .............................. 90204263 U

(51) Int. Cl.
*G06F 1/16* (2006.01)
(52) U.S. Cl. ..................................... 361/681; D14/316
(58) Field of Classification Search ................ 361/681; 248/176.1, 917, 918, 919–924; D14/316, D14/324, 375, 376; 345/905, 156, 659, 169
See application file for complete search history.

(56) References Cited

U.S. PATENT DOCUMENTS

| 4,438,458 A | * | 3/1984 | Munscher | 348/838 |
| 5,492,301 A | * | 2/1996 | Hauser | 248/516 |
| 5,701,347 A | * | 12/1997 | Daniels et al. | 381/300 |
| 5,870,280 A | * | 2/1999 | Cho | 361/681 |
| 6,134,103 A | * | 10/2000 | Ghanma | 361/681 |

* cited by examiner

*Primary Examiner*—Kent Chang
(74) *Attorney, Agent, or Firm*—Ladas & Parry LLP

(57) ABSTRACT

The invention provides a pedestal for supporting a monitor. The pedestal includes a first base and a second base. The first base further includes a first supporting surface and a recess, while the second base further includes a second supporting surface. The second base is movably connected to the first base such that it can be reciprocated between a first position and a second position. The invention utilizes the reciprocal feature of the second base to increase the contact area between the pedestal and the desktop and reduce the total packaging volume of the pedestal and the monitor.

8 Claims, 9 Drawing Sheets

LCD MONITOR PEDESTAL

BACKGROUND OF THE INVENTION

1. Field of the Invention

The present invention relates to a pedestal, and in particular to a pedestal for an LCD monitor.

2. Description of the Related Art

FIG. 1 shows a perspective view of an LCD monitor 1 and a conventional pedestal 2 joined thereto.

FIG. 1 shows a perspective view of an LCD monitor 1 and a conventional pedestal 2 joined thereto.

FIG. 2A shows a perspective assembly view in which an LCD monitor 1 is joined to the pedestal P1 according to a first embodiment of the invention. FIG. 2B shows an exploded perspective view of the monitor and pedestal shown in FIG. 2A.

SUMMARY OF THE INVENTION

An object of the invention is to provide a pedestal for supporting a monitor. The pedestal comprises a first base having a first supporting surface and a recess, and a second base having a second supporting surface. The monitor is disposed on the first base. The second base is movably connected to the first base such that it can be reciprocated between a first position and a second position. Therefore, in the first position, the second base is retracted inside the recess, while in the second position, the second base is extended outside the recess such that the second supporting surface is co-planar with the first supporting surface.

A detailed description will be given by the following embodiments with reference to the accompanied drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

First Embodiment

Figure 1:
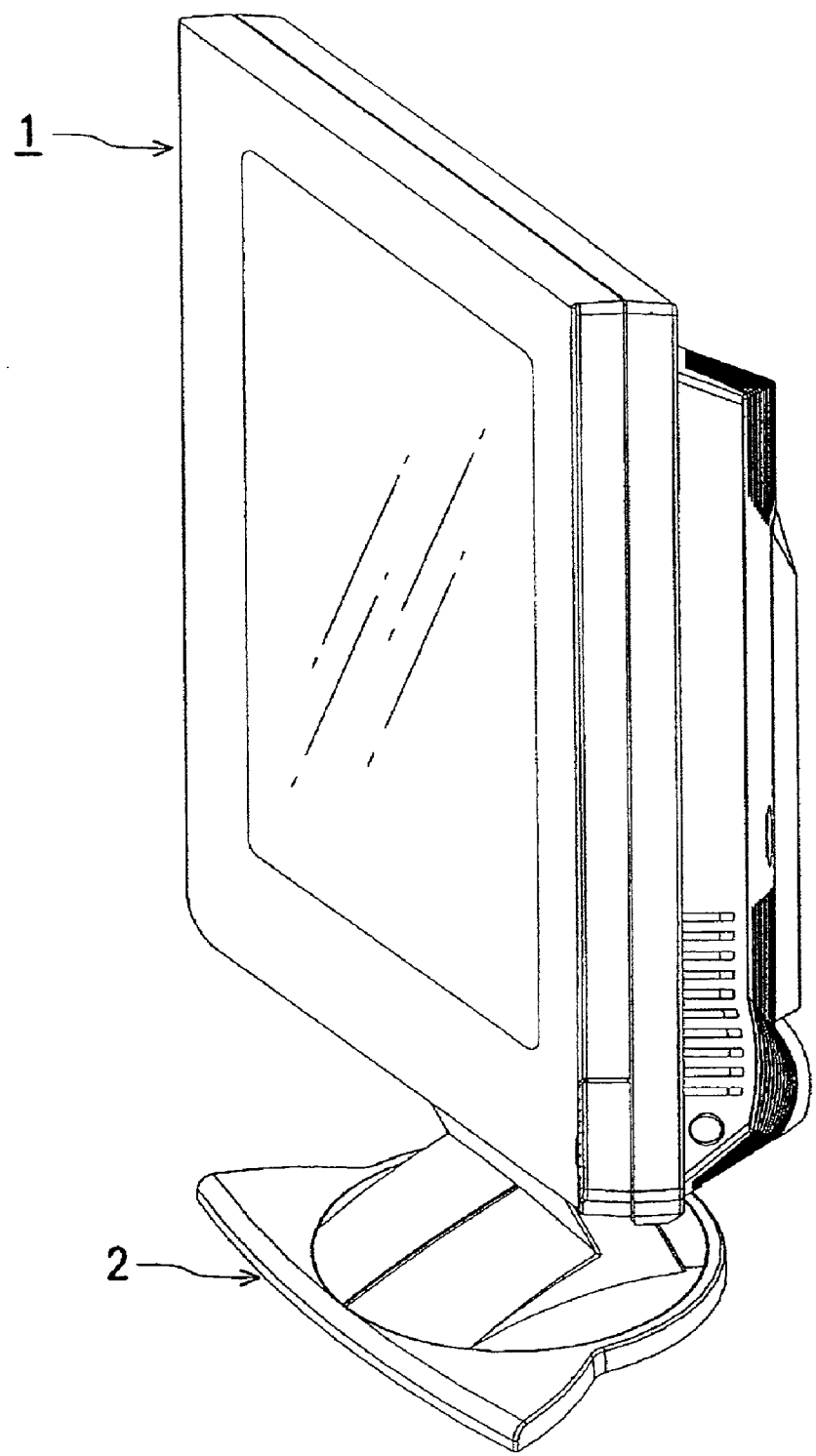
FIG. 1 shows a perspective view of a LCD monitor and a conventional pedestal joined thereto.
Figure 2A:
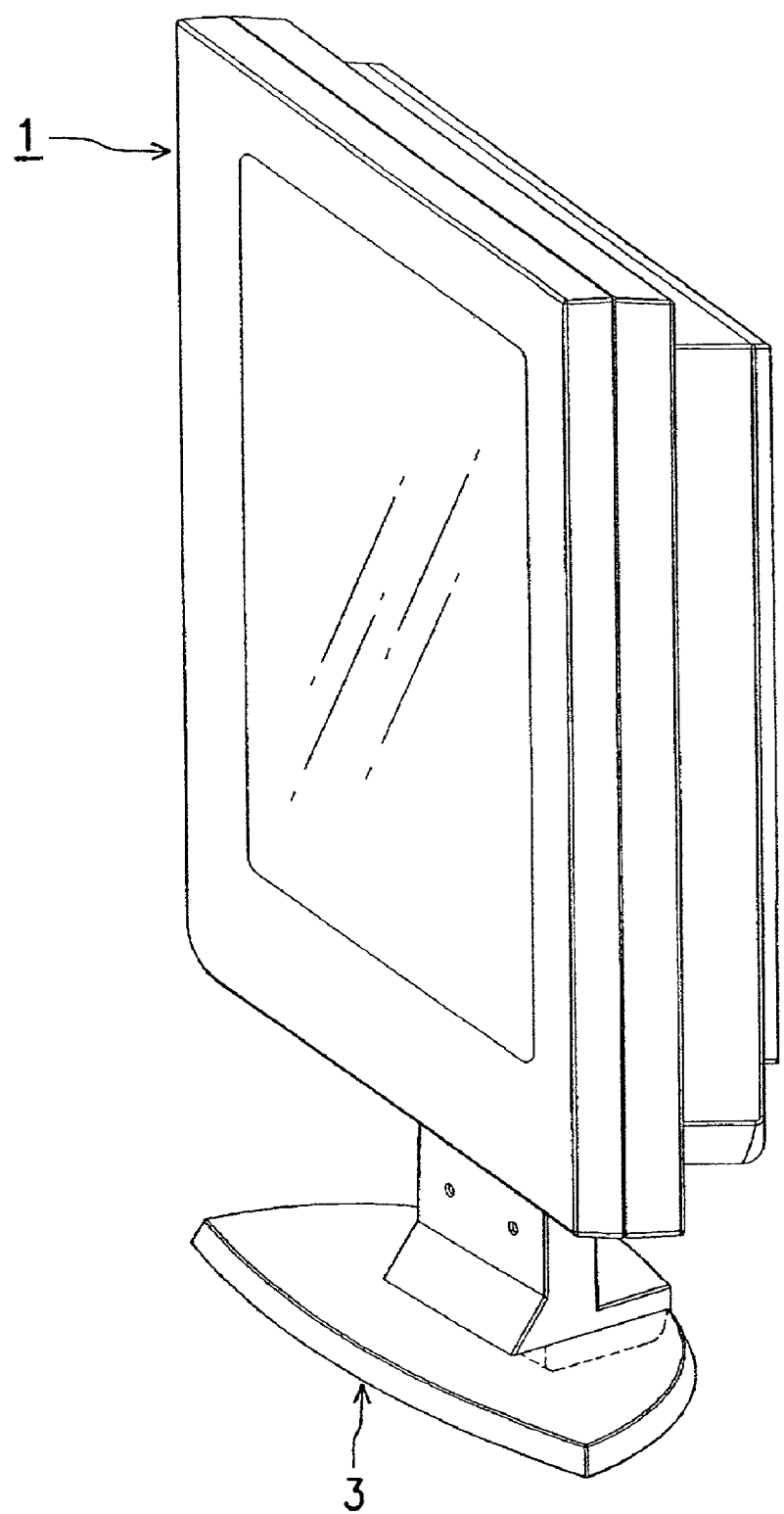
FIG. 2A shows a perspective assembly view of the first embodiment of the invention.
Figure 2B:
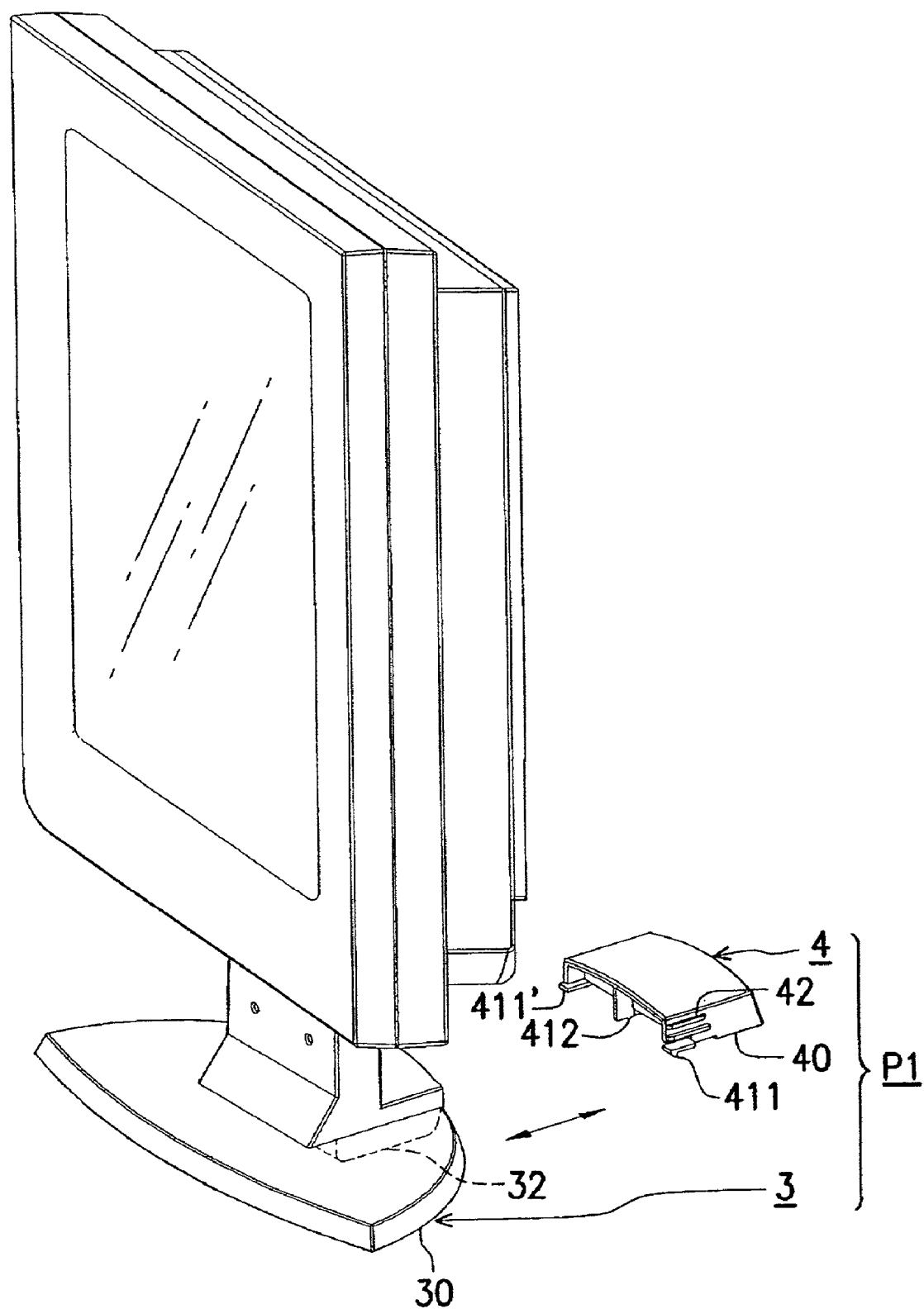
FIG. 2B shows an exploded perspective view of the first embodiment of the invention.

FIG. 2A shows a perspective assembly view in which a LCD monitor 1 is joined to the pedestal P1 according to a first embodiment of the invention. FIG. 2B shows an exploded perspective view of the monitor and pedestal shown in FIG. 2A.

As shown in FIG. 2B, the pedestal P1 includes a first base 3 and a second base 4, wherein the first base 3 further includes a recess 32. The second base 4 is a substantially rectangular member. The second base 4 has two opposite guiding portions 42, two opposite engaging portions 411 (411'), and an engaging portion 412 formed on the bottom of the second base 4. The guiding portions 42 are comprised of a plurality of flanges spaced from each other.

The LCD monitor 1 is detachably engaged with the first base 3, and the second base 4 is detachably engaged with the first base 3. The first base 3 includes a first supporting surface 30. The second base 4 includes a second supporting surface 40. The first supporting surface 30 is substantially co-planar with the second supporting surface 40. The second base 4 is movably connected to the first base 3 such that it can be reciprocated between a first position and a second position.

Figure 3A:
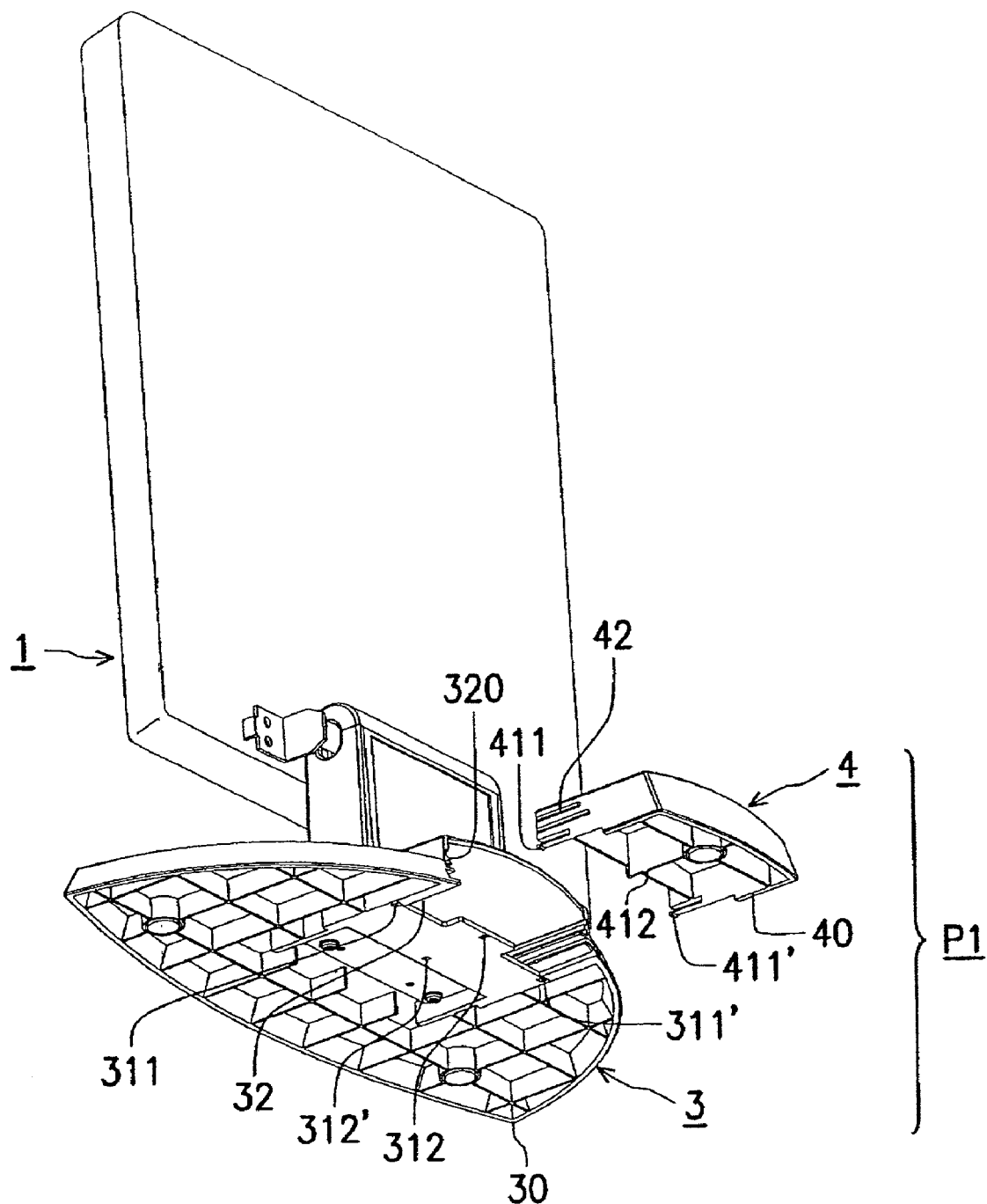
FIG. 3A shows an exploded perspective view of the first embodiment of the invention viewed from another position.
Figure 3B:
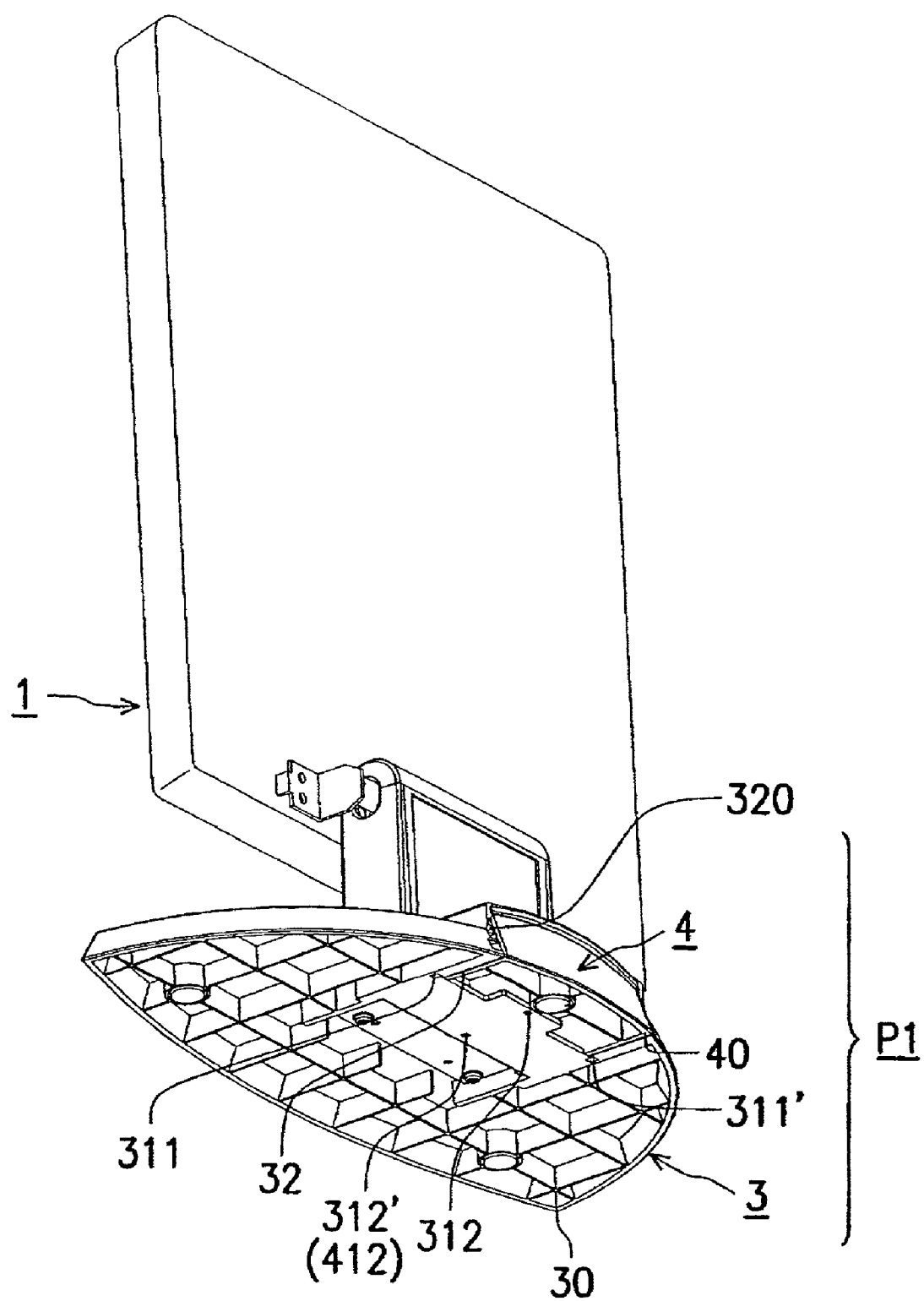
FIG. 3B shows a perspective view of the second base joined to the first base.
Figure 3C:
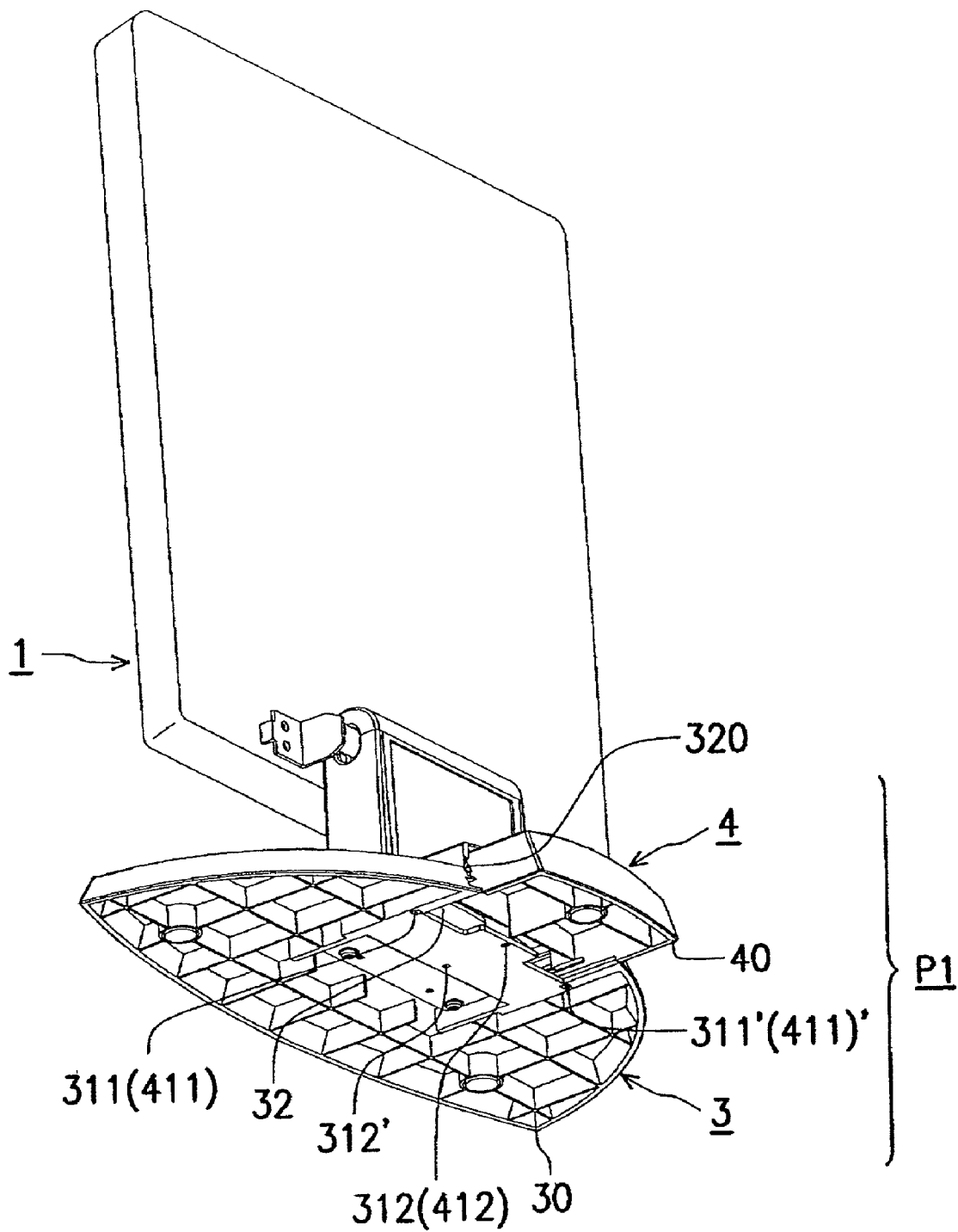
FIG. 3C shows a perspective view of the second base moved out of the first base.

FIG. 3A shows an exploded perspective view of the monitor 1, the first base 3, and the second base 4 illustrated in FIG. 2. FIG. 3B shows a perspective view of the second base 4 joined to the first base 3. FIG. 3C shows a perspective view of the second base moved out of the first base.

Referring to FIG. 3A, the first supporting surface 30 is located on the bottom of the first base 3 of the pedestal P1, and the recess 32 is formed in the first base 3. There are a plurality of recessed channels 320 which corresponding to the flanges of the guiding portion 42 formed on two sides of the recess 32. Four positioning portions 311, 311', 312, and 312' are formed on the first supporting surface 30. The two positioning portions 311, 311' are used to receive the two engaging portions 411, 411' of the second base 4, respectively, while the two positioning portions 312, 312' are used to receive the engaging portion 412 of the second base 4 at the first and second positions, respectively.

Also referring to FIG. 3A, the two opposite guiding portions 42 of the second base 4 are fitted into the plurality of recessed channels 320 of the recess 32 such that the second base 4 is reciprocally movable between the first position (as shown in FIG. 3B) and the second position (as shown in FIG. 3C).

Referring to FIG. 3B, when the second base 4 is completely fitted into the recess 32 of the first base 3, the engaging portion 412 of the second base 4 is detachably engaged with the positioning portion 312' of the first base 3 so as to prevent the second base 4 from moving out of the first base 3.

Referring to FIG. 3C, when the second base 4 is moved outward, which is moved along the plurality of recessed channels 320. When the engaging portion 412 of the second base 4 is engaged with the positioning portion 312 of the first base 3, the engaging portions 411, 411' are detachably located in the positioning portions 311, 311' respectively, the second base 4 is located at the second position, hence the LCD monitor 1 is supported by the first supporting surface 30 of the first base 3 and the second supporting surface 40 of the second base 4. In addition to effectively increasing the contact area of the pedestal on a desktop, the actual total packaging volume of the LCD monitor 1 can be reduced due to reciprocally movable feature of the second base 4 between the first position and the second position.

Second Embodiment

Figure 4A:
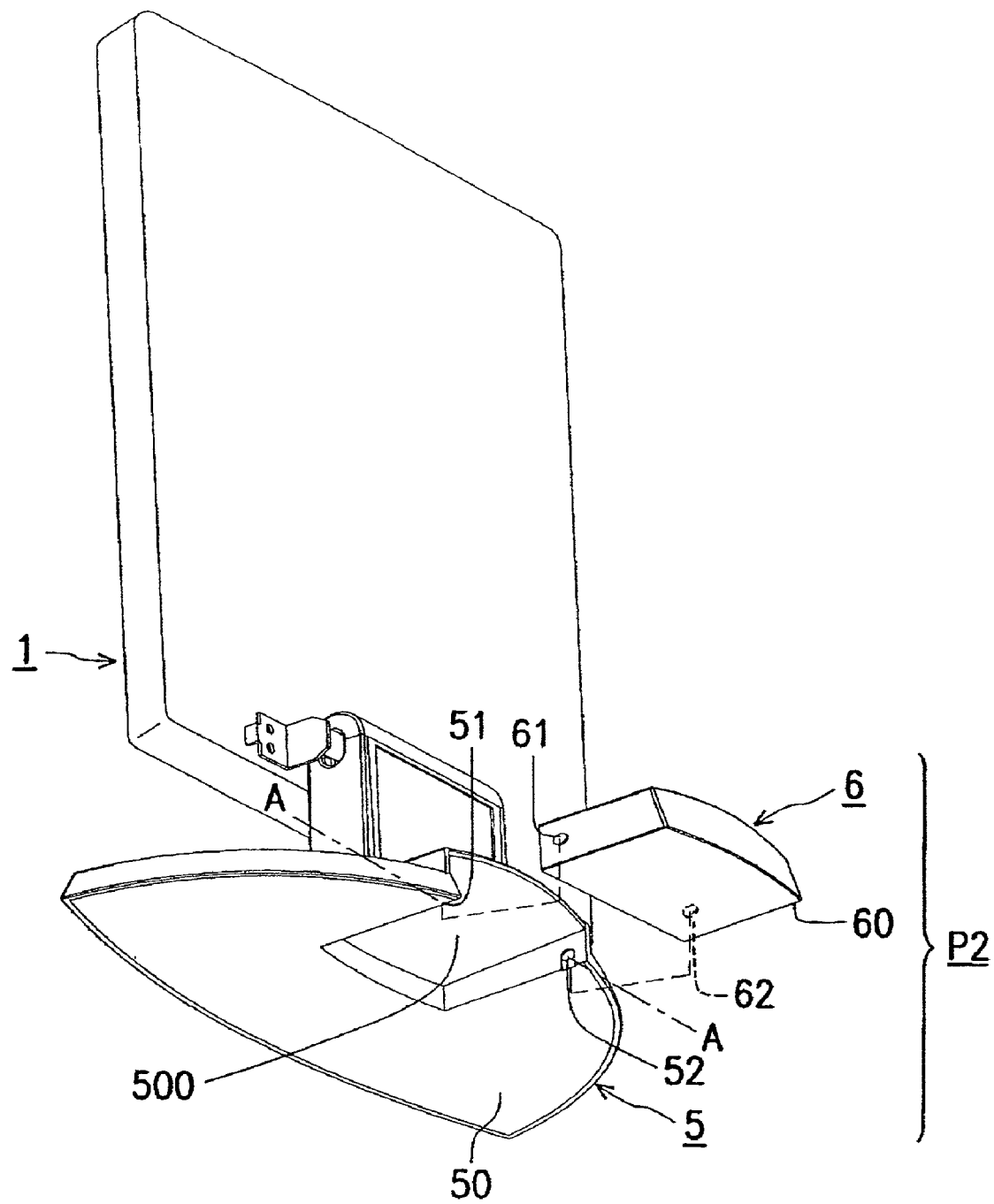
FIG. 4A shows an exploded perspective view of the second embodiment of the invention.

FIG. 4A shows an exploded perspective view of a pedestal P2 according to a second embodiment of the invention.

The pedestal P2 includes a first base 5 and a second base 6, wherein the LCD monitor 1 is pivotally connected to the first base 5 and the second base 6 is pivotally connected to the first base 5 such that it can pivot around an axis A—A.

The first base 5 includes a first supporting surface 50. A recess 500 is formed on the first supporting surface 50. Two opposite positioning portions 51, 52 are formed on the inner walls of the recess 500.

Figure 4B:
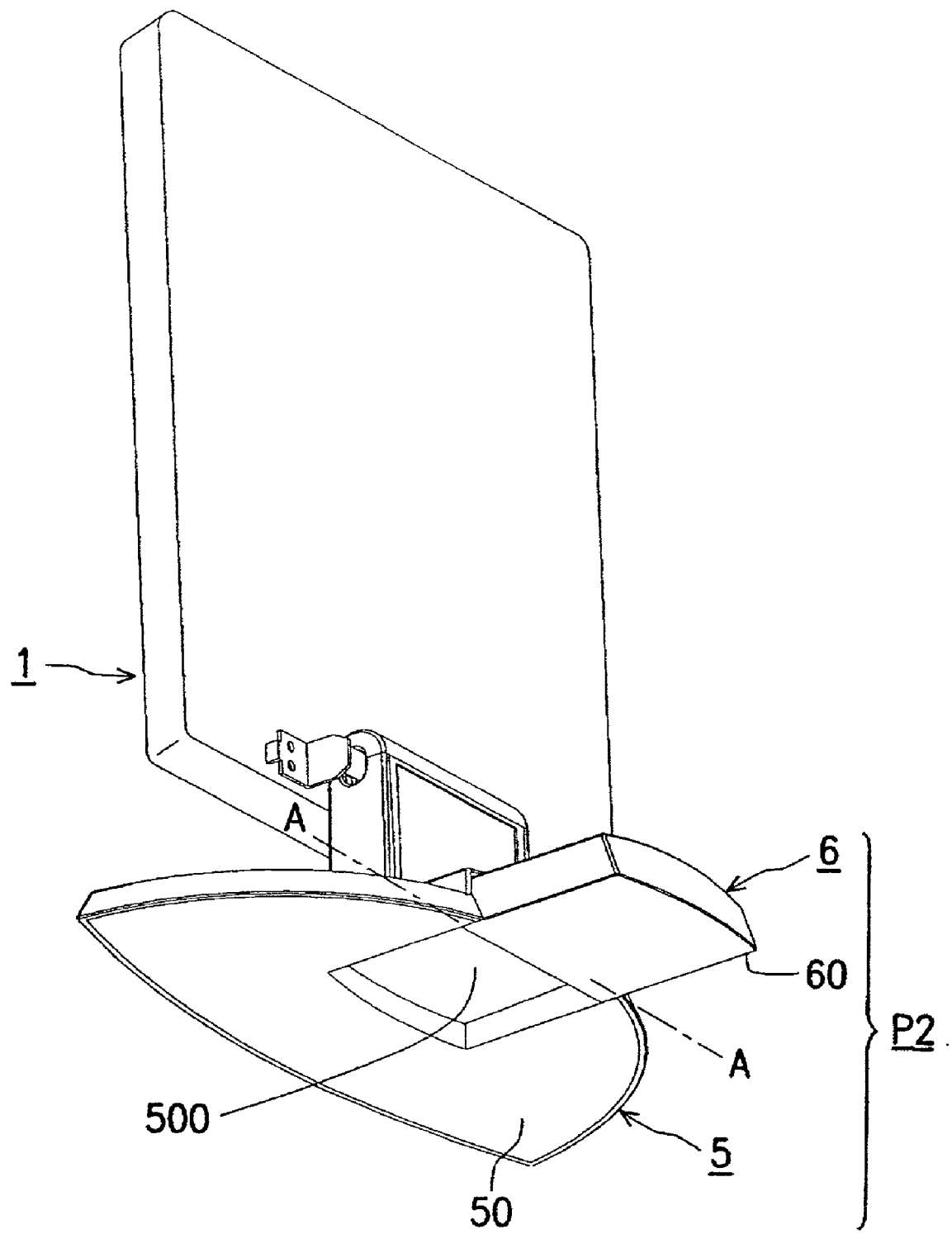
FIG. 4B shows a perspective view of the second base moved out of the first base.
Figure 4C:
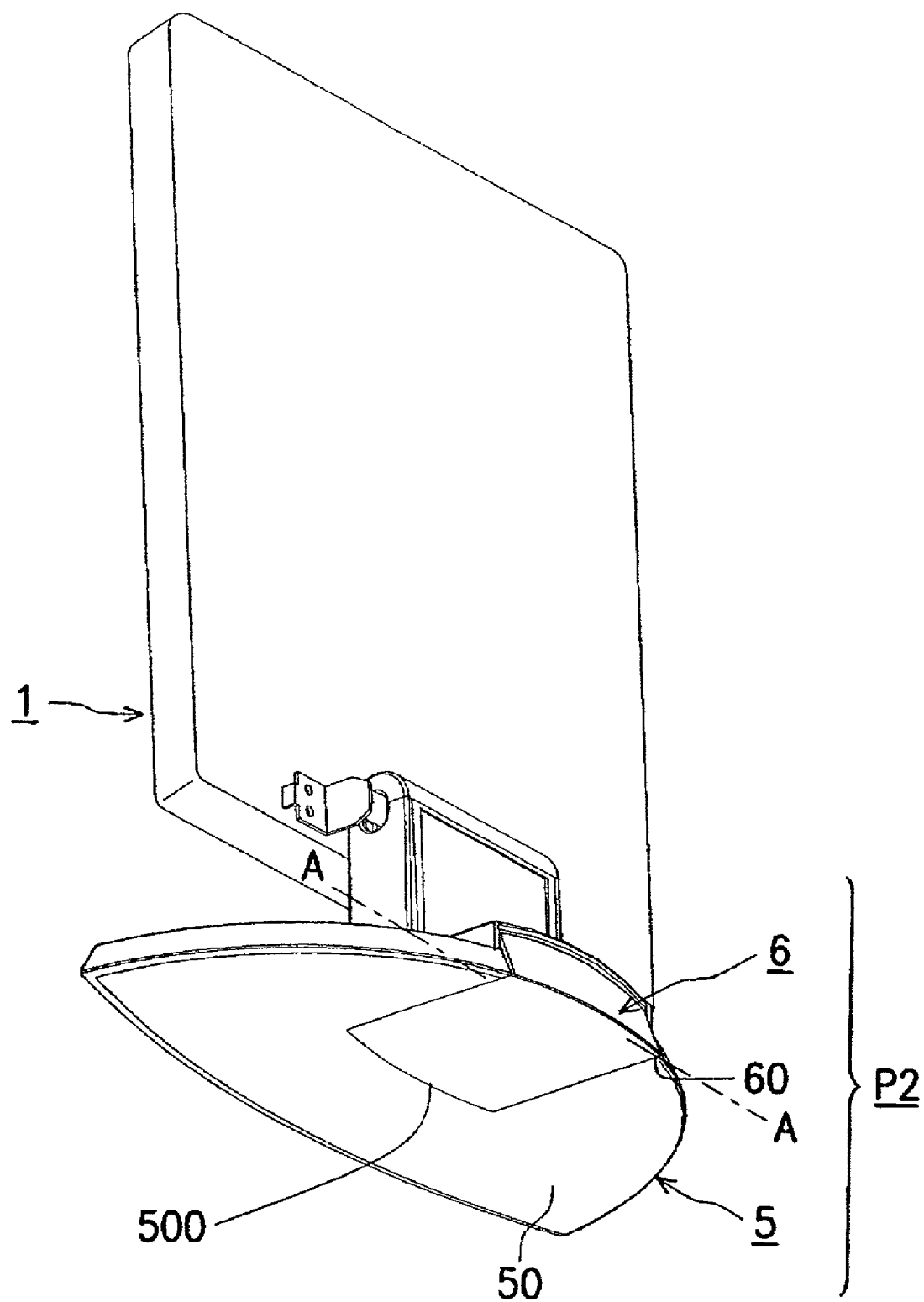
FIG. 4C shows a perspective view of the second base joined to the first base.

The second base 6 includes a second supporting surface 60 and two opposite engaging portions 61, 62. The two engaging portions 61, 62 are engaged with the two positioning portions 51, 52 of the first base 5, respectively, whereby the second base 6 is pivoted to the first base 5 such that it can move between a first position (as shown in FIG. 4C) and a second position (as shown in FIG. 4B). FIG. 4B shows a perspective view in which the second base 6 is joined to the first base 5 in the second position.

When the second base 6 is pivoted to the first base 5 by inserting the engaging portions 61, 62 into the positioning portions 51, 52, the first supporting surface 50 of the first base 5 and the second supporting surface 60 of the second base 6 are co-planar for supporting the LCD monitor 1.

FIG. 4C shows a perspective view in which the first and second bases are in a first position. Pivoting around the axis A—A, the second base 6 is completely accommodated in the recess 500 of the first base 5.

It is understood that the first and second bases can be packaged separately. At this time, the difference with the first embodiment is that the first base does not have a recess 32. When a user wants to use the LCD monitor, he simply needs to assemble the second base to the first base.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pedestal for supporting a monitor on a load bearing surface, comprising:
    a first base having a first supporting surface, the monitor being disposed on the first base;
    a second base having a second supporting surface, the second base pivoting on the first base such that it can be reciprocated between a first position and a second position,
    wherein the second supporting surface is co-planar with the first supporting surface to define a first supporting area abutting the load bearing surface for supporting the monitor when the second base is positioned at the second position, the second supporting surface is received within the first base to define a second supporting area abutting the load bearing surface when the second base is positioned at the first position, and the second supporting area is less than the first supporting area.

2. The pedestal as claimed in claim 1, wherein the first base further comprises a recess, the second base is retracted inside the recess when it is positioned at the first position, the second base is extended outside the recess when it is positioned at the second position.

3. The pedestal as claimed in claim 2, wherein, in the first position, the second supporting surface abuts an inner surface of the recess.

4. A flat display device, comprising:
    a monitor; and
    a pedestal for supporting the monitor on a load bearing surface, having a first base and a second base, the first base having a first supporting surface, the monitor being disposed on the first base, the second base having a second supporting surface, and the second base pivoting on the first base such that it can be reciprocated between a first position and a second position,
    wherein the second supporting surface is co-planar with the first supporting surface to define a first supporting area abutting the load bearing surface for supporting the monitor when the second base is positioned at the second position, the second supporting surface is received within the first base to define a second supporting area abutting the load bearing surface when the second base is positioned at the first position, and the second supporting area is less than the first supporting area.

5. The flat display device as claimed in claim 4, wherein the first base has a positioning portion, the second base has an engaging portion, the engaging portion is detachably connected to the positioning portion.

6. A pedestal for supporting a monitor on a load bearing surface, comprising:
    a first base having a first supporting surface, the monitor being disposed on the first base;
    a second base having a second supporting surface, the second base pivoting on the first base such that it can be reciprocated between a first position and a second position,
    wherein the second supporting surface is co-planar with the first supporting surface and defining a first supporting area abutting the load bearing surface for supporting the monitor when the second base is positioned at the second position, the second supporting surface being received within the first base and defining a second supporting area abutting the load bearing surface when the second base is positioned at the first position, the first and second supporting areas having respective peripheral edges, the peripheral edge of the first supporting area encompassing a greater area than the peripheral edge of the second supporting area.

7. The pedestal as claimed in claim 6, wherein the first base further comprises a recess, the second base is retracted inside the recess when it is positioned at the first position, and the second base is extended outside the recess when it is positioned at the second position.

8. The pedestal as claimed in claim 7, wherein, in the first position, the second supporting surface abuts an inner surface of the recess.

* * * * *